(12) United States Patent
Kobayashi et al.

(10) Patent No.: US 7,833,501 B2
(45) Date of Patent: Nov. 16, 2010

(54) METHOD AND APPARATUS FOR TREATING DISCHARGE GAS

(75) Inventors: Kazuki Kobayashi, Hiroshima (JP); Hirofumi Kikkawa, Hiroshima (JP); Hiroshi Ishizaka, Hiroshima (JP); Goki Sasaki, Hiroshima (JP); Hiroyuki Nosaka, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/516,835

(22) PCT Filed: Dec. 24, 2007

(86) PCT No.: PCT/JP2007/074766

§ 371 (c)(1),
(2), (4) Date: May 29, 2009

(87) PCT Pub. No.: WO2008/078722

PCT Pub. Date: Jul. 3, 2008

(65) Prior Publication Data

US 2010/0074817 A1    Mar. 25, 2010

(30) Foreign Application Priority Data

Dec. 27, 2006 (JP) .............................. 2006-353273

(51) Int. Cl.
*B01D 53/50* (2006.01)
*B01D 53/64* (2006.01)
*B01D 53/74* (2006.01)
*B01D 53/75* (2006.01)

(52) U.S. Cl. ............... 423/210; 423/235; 423/239.1; 423/242.1; 423/215.5; 423/DIG. 5; 423/DIG. 6; 422/105; 422/111; 422/168; 422/169; 422/170; 422/171; 422/172

(58) Field of Classification Search ................. 423/210, 423/235, 239.1, 242.1, 215.5, DIG. 5, DIG. 6; 422/105, 111, 168–172
See application file for complete search history.

(56) References Cited

U.S. PATENT DOCUMENTS 4,298,497 A * 11/1981 Colombo .................. 110/343

(Continued)

FOREIGN PATENT DOCUMENTS

JP    2000-317260    1/2000

(Continued)

OTHER PUBLICATIONS

The English translation of JP 2000-317,260 A dated Nov. 21, 2000.*

(Continued)

*Primary Examiner*—Timothy C Vanoy
(74) *Attorney, Agent, or Firm*—Greenblum & Bernstein, P.L.C.

(57) ABSTRACT

A method and apparatus for treating an exhaust gas comprising heavy metals, wherein the apparatus comprises a heat recovery unit, recovering exhaust gas heat at an exit of the air preheater; a precipitator, collecting soot/dust contained in an exhaust gas at an exit of the heat recovery unit; a wet flue gas desulfurizer, removing sulfur oxides contained in the exhaust gas at the exit of the precipitator; and a reheater, heating the exhaust gas at the exit of the wet flue gas desulfurizer. Each of the heat recovery unit and the reheater has a heat exchanger tube, and a circulation line is disposed to connect the heat exchanger tubes. A sulfur trioxide ($SO_3$) removing agent is supplied to the upstream side of the heat recovery unit, and the temperature of the exhaust gas at the exit of the heat recovery unit is adjusted to not more than a dew point of sulfur trioxide.

14 Claims, 9 Drawing Sheets

U.S. PATENT DOCUMENTS

| | | | |
|---|---|---|---|
| 5,470,556 A * | 11/1995 | Samish | ................. 423/243.08 |
| 7,507,381 B2 | 3/2009 | Muramoto et al. | |
| 2006/0099902 A1 | 5/2006 | Kikkawa et al. | |
| 2008/0209899 A1 | 9/2008 | Muramoto et al. | |
| 2009/0173234 A1 | 7/2009 | Ueda et al. | |

FOREIGN PATENT DOCUMENTS

| | | |
|---|---|---|
| JP | 2001-000833 | 11/2000 |
| WO | 2004/023040 | 3/2004 |

OTHER PUBLICATIONS

The English translation of JP 2001-000,833 A dated Jan. 9, 2001.*
U.S. Appl. No. 12/373,817 to Nagai et al., filed Jan. 14, 2009.
U.S. Appl. No. 12/516,845 to Kobayashi et al., filed May 29, 2009.
Tatsuhiro Fujii, et al., "Technology on the Bag Filter System for Flue Gas Treatment to Remove Simultaneously Many Kinds of Harmful Compounds from a Municipal Solid Waste Incinerator," Hitachi Zosen Technical Review, Hitachi Ship-building Corporation, Jun. 1992, vol. 53, No. 2, pp. 23-30.

* cited by examiner

F I G. 3
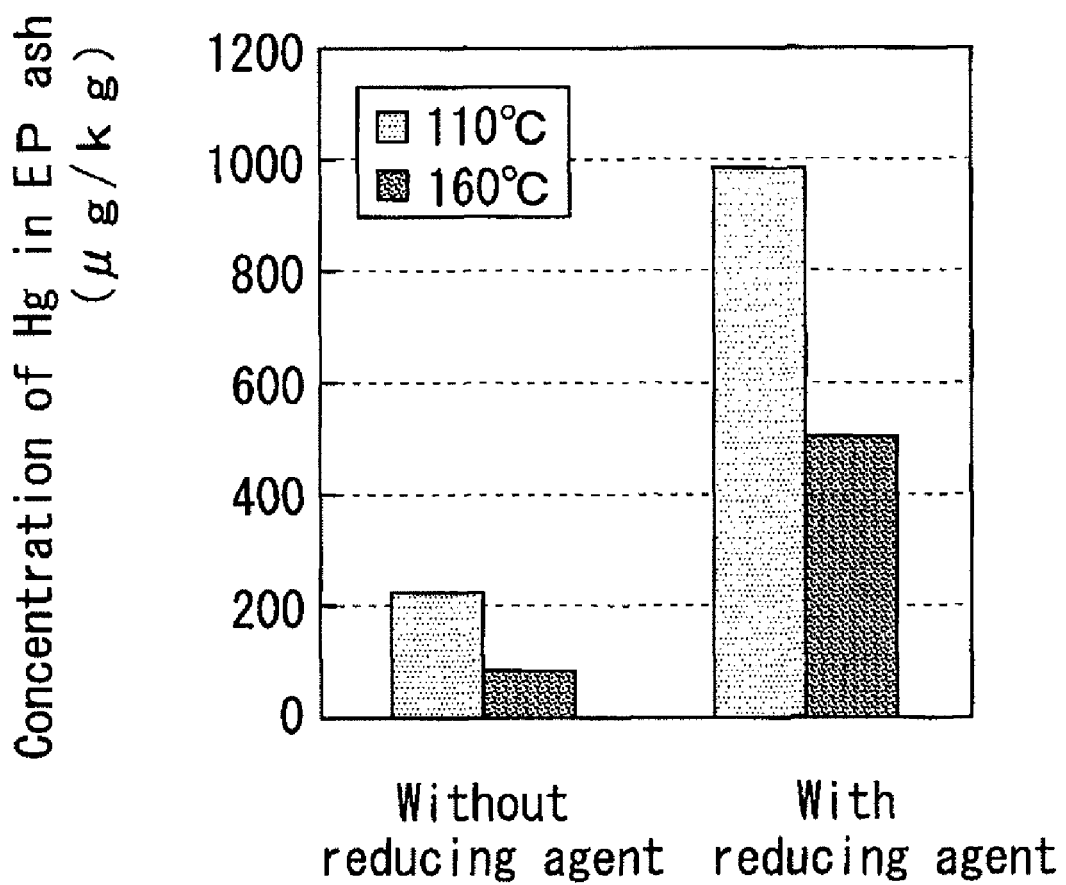

F I G. 4
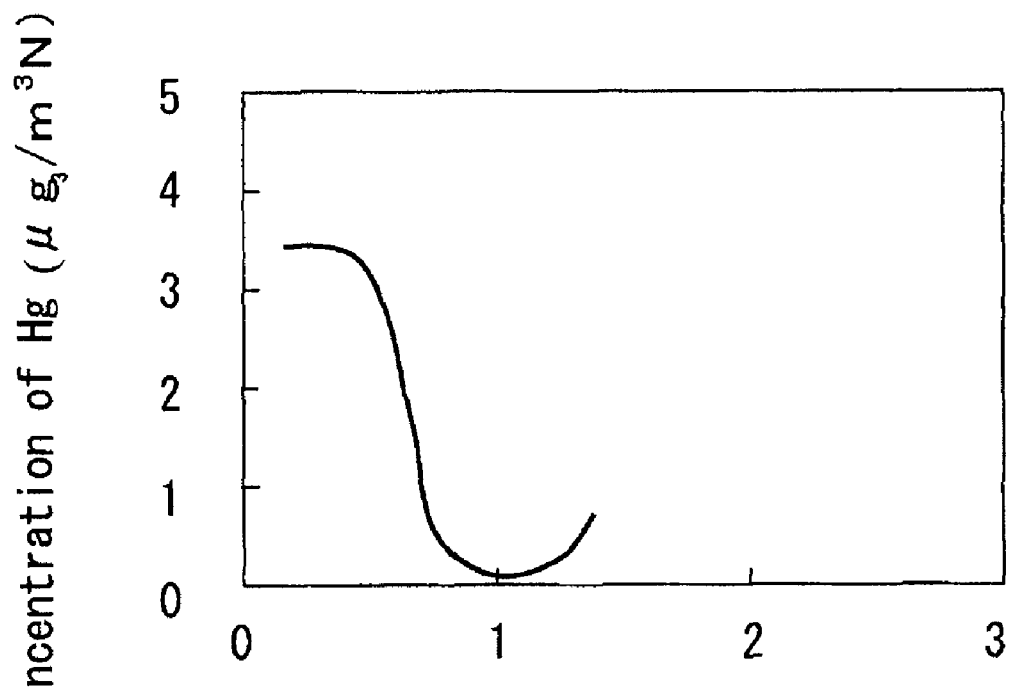
Neutralizing agent supply amount
in mole equivalents with respect to $SO_3$ F I G. 6
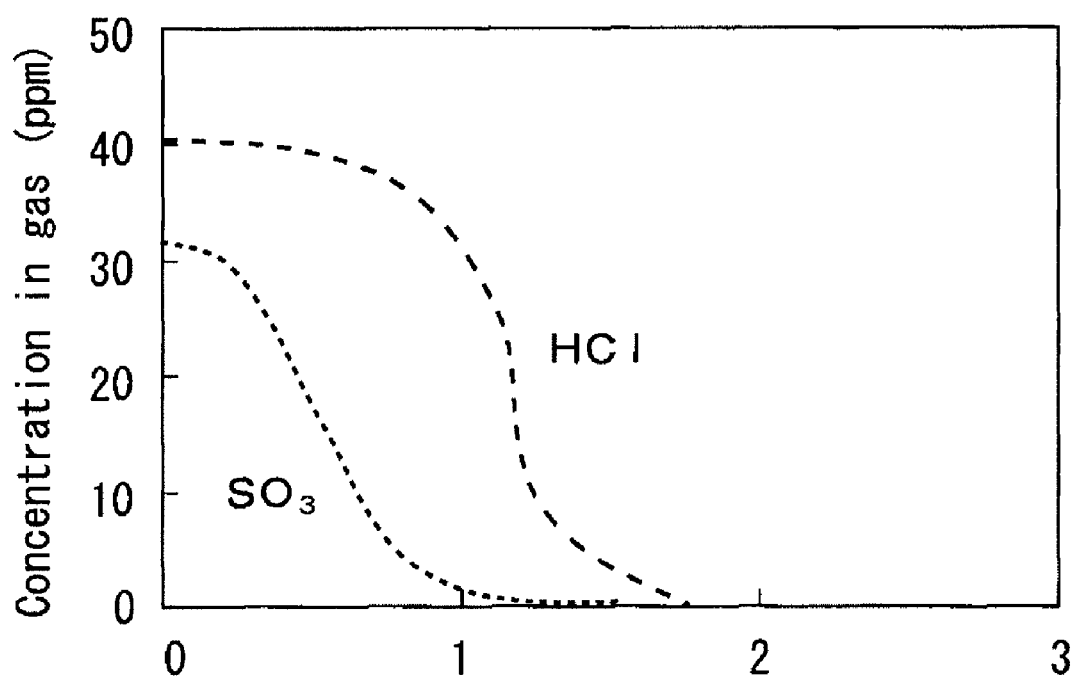
Reducing agent supply amount
in mole equivalents with respect to $SO_3$

METHOD AND APPARATUS FOR TREATING DISCHARGE GAS

TECHNICAL FIELD

The present invention relates to an exhaust gas treating method and apparatus and particularly relates to an apparatus and a method, which are for reducing trace component concentrations in an exhaust gas discharged from a chimney and with which trace component removal performance in a dry precipitator is improved to remove trace heavy metal components in the exhaust gas.

BACKGROUND ART

Mercury and other heavy metals are contained in addition to nitrogen oxides and sulfur oxides in an exhaust gas discharged from a thermal power plant boiler, etc., which is a combustion apparatus that uses coal or other fossil fuel. Although the nitrogen oxides are removed by NOx removal equipment and the sulfur oxides are removed by a desulfurizer, mercury, selenium, cadmium, chromium, lead, zinc, and other heavy metals cannot be removed by the NOx removal equipment or desulfurizer and cannot be trapped completely by a precipitator for removing soot/dust in the exhaust gas. Because these heavy metals are high in toxicity, emission restrictions thereof have recently become stricter. Methods for removing heavy metals contained in the exhaust gas, particularly mercury, which is high in toxicity, are being examined.

FIG. 8 illustrates one such method and shows an exhaust gas treating system applied to remove mercury in an exhaust gas from a waste incinerator or other combustion apparatus 1. With this exhaust gas treating system, the exhaust gas from the combustion apparatus 1 is first treated by NOx removal equipment 2 to remove nitrogen oxides, and combustion air to be used in the combustion apparatus 1 is then heated by the exhaust gas in an air preheater 3. Soot/dust in the exhaust gas discharged from the air preheater 3 are then trapped by a precipitator 4, the exhaust gas discharged from the precipitator 4 is guided by an induction fan 5 to a wet flue gas desulfurizer 6 to remove sulfur oxides in the exhaust gas, and the exhaust gas is discharged by a boost-up fan 7 into air from a chimney 8. A measurement unit 9 for measuring concentrations of the sulfur oxides, nitrogen oxides, heavy metals (Hg), etc., in the exhaust gas is disposed at an upstream side of the chimney 8 to monitor concentrations of these components in the exhaust gas.

The exhaust gas treating system shown in FIG. 8 is characterized in that a mercury adsorbent is added by a mercury adsorbent supply unit 16, etc., into the exhaust gas at an entrance (front stage) of the precipitator 4, and with this exhaust gas treating system, the exhaust gas at the entrance (front stage) of the precipitator 4 is in a temperature range (150 to 240° C.) in which a mercury adsorption performance of activated carbon, etc., is highest and the activated carbon, etc., to which mercury has become adsorbed, is recovered by the precipitator 4 (see, for example, Non-Patent Document 1, etc.).

FIG. 9 shows an exhaust gas treating system applied to removing mercury in an exhaust gas from a thermal power plant boiler, and with this system, heavy metal concentrations in the exhaust gas that is discharged to the atmosphere are adjusted to be within predetermined ranges by lowering an exhaust gas temperature to economically remove heavy metals in the exhaust gas without using an absorbing agent for absorbing the heavy metals in the exhaust gas.

With the exhaust gas treating system shown in FIG. 9, the exhaust gas from the boiler or other combustion apparatus 1 is supplied to the NOx removal equipment 2 to be removed of the nitrogen oxides and is thereafter used for heating the combustion air in the air preheater 3. A heating medium in a heat recovery unit 11 is then heated by the exhaust gas discharged from the air preheater 3, the soot/dust in the exhaust gas that has been lowered in temperature and is discharged from the heat recovery unit 11 are trapped efficiently by the precipitator 4, and the exhaust gas discharged from the precipitator 4 is guided by the induction fan 5 to the wet flue gas desulfurizer 6 to be desulfurized. The exhaust gas discharged from the wet flue gas desulfurizer 6 is reheated by a reheater 13 using the heating medium that is circulatingly supplied from the heat recovery unit 11 via heating medium circulating ducts 15-1 and 15-2, and is discharged by the boost-up fan 7 into air from the chimney 8 (Patent Document 1). The measurement unit 9 for measuring the concentrations of the sulfur oxides, nitrogen oxides, heavy metals, etc., in the exhaust gas before discharge from the chimney 8 is also disposed in the system shown in FIG. 9 to monitor the concentrations of these components in the exhaust gas.

The exhaust gas treating system shown in FIG. 9 makes use of the fact that the heavy metals in the exhaust gas become attached more readily to solid surfaces of ash particles, etc., the lower the exhaust gas temperature, and the heavy metals in the ash particles can be recovered by an appropriate method or a treatment for preventing elution from the ash particles can be applied. In Patent Document 1, it is disclosed that a heavy metal concentration in the exhaust gas can be suppressed by a method of measuring the concentration of the heavy metal (Hg) in the exhaust gas discharged from the wet flue gas desulfurizer 6 in the exhaust gas treating system shown in FIG. 9 and adjusting one or more among: a pH of an absorbing solution used in the wet flue gas desulfurizer 6; an oxidizing air flow rate; and a wastewater flow rate; so that a measurement value of the heavy metal concentration falls within a predetermined range.

Non-Patent Document 1: Tatsuhiro Fujii and six others, "Technology on the Bag Filter System for Flue Gas Treatment to Remove Simultaneously Many Kinds of Harmful Compounds from a Municipal Solid Waste Incinerator," Hitachi Zosen Technical Review, Hitachi Shipbuilding Corporation, June, 1992, Vol. 53, No. 2, p. 23-30. Patent Document 1: International Patent Publication No. 2004/023040 Pamphlet

DISCLOSURE OF THE INVENTION

Problems to be Solved by the Invention

According to consideration by the present inventors, with the exhaust gas treating system described in Non-Patent Document 1 described above, in a case where coal that contains a large amount of sulfur is used as the fuel of the boiler, etc., the heavy metals in the exhaust gas generated are hardly adsorbed by the activated carbon that is the adsorbent and remain contained as they are in the exhaust gas that is supposed to have been subject to exhaust gas treatment. It was also found that with the exhaust gas treating system described in Patent Document 1, the heavy metals in the exhaust gas are not recovered much even if the exhaust gas temperature is lowered in the case where coal that contains a large amount of sulfur is used as the fuel of the boiler, etc.

An object of the present invention is to provide an exhaust gas treating method and apparatus that effectively removes heavy metals in an exhaust gas even in a case where coal that contains a large amount of sulfur is used as a fuel.

Means for Solving the Problems

The object of the present invention can be achieved by the following solutions.

A first aspect of the present invention provides an exhaust gas treating method including the steps of: preheating a combustion air of a combustion apparatus 1 by an exhaust gas discharged from the combustion apparatus 1; recovering heat from the exhaust gas by a heat recovery unit 11 after the air preheating; and recovering soot/dust in the exhaust gas at an exit of the heat recovery unit 11 by a dry precipitator 4; and with this method, a sulfur trioxide removing agent is supplied into the exhaust gas at an upstream side of an entrance of the heat recovery unit 11.

A second aspect of the present invention provides the exhaust gas treating method according to the first aspect where an exhaust gas temperature at the exit of the heat recovery unit 11 is lowered to near a dew point temperature of sulfur trioxide.

A third aspect of the present invention provides the exhaust gas treating method according to the first aspect where a nitrogen oxide in the exhaust gas is denitrated by a denitration catalyst before the air preheating and a sulfur oxide in the exhaust gas is desulfurized at the exit of the dry precipitator 4.

A fourth aspect of the present invention provides the exhaust gas treating method according to the second aspect where the heat of the exhaust gas is recovered by a heating medium in the heat recovery unit 11, the heating medium is circulatingly supplied to a reheater 13, disposed for heating the desulfurized exhaust gas by the heating medium supplied from the heat recovery unit 11, and the exhaust gas temperature at the exit of the heat recovery unit 11 is lowered to near the dew point temperature of sulfur trioxide by adjusting at least one among a heating medium circulation amount, a heating medium heating amount, and a heating medium cooling amount.

A fifth aspect of the present invention provides the exhaust gas treating method according to the first aspect where a sulfur trioxide reducing agent or a sulfur trioxide neutralizing agent is used as the sulfur trioxide removing agent.

A sixth aspect of the present invention provides the exhaust gas treating method according to the first aspect where a sulfur trioxide adsorbent is used as the sulfur trioxide removing agent.

A seventh aspect of the present invention provides the exhaust gas treating method according to the first aspect where at least one among a sulfur trioxide concentration, a chlorine concentration, and a heavy metal concentration in the exhaust gas at the exit of the dry precipitator 4 is measured and an amount of the sulfur trioxide removing agent that is in accordance with the measured concentration is supplied into the exhaust gas.

An eighth aspect of the present invention provides an exhaust gas treating apparatus including: an air preheater 3, preheating a combustion air of the combustion apparatus 1 by an exhaust gas discharged from the combustion apparatus 1; a heat recovery unit 11, recovering heat from the exhaust gas at an exit of the air preheater 3; and a dry precipitator 4, recovering soot/dust in the exhaust gas at an exit of the heat recovery unit 11; which are successively disposed from an upstream side to a downstream side of an exhaust gas duct of a combustion apparatus 1, and further including: a sulfur trioxide removing agent supply unit 18, supplying a sulfur trioxide removing agent into the exhaust gas at an upstream side of an entrance of the heat recovery unit 11.

A ninth aspect of the present invention provides the exhaust gas treating apparatus according to the eighth aspect further including an exhaust gas temperature controller 24, performing control to lower an exhaust gas temperature at the exit of the heat recovery unit 11 to near a dew point temperature of sulfur trioxide.

A tenth aspect of the present invention provides the exhaust gas treating apparatus according to the eighth aspect, further including NOx removal equipment 2, denitrating a nitrogen oxide in the exhaust gas generated from the combustion apparatus 1 and disposed at an upstream side of an entrance of the air preheater 3; and a desulfurizer 6, desulfurizing a sulfur oxide in the exhaust gas at an exit of the dry precipitator 4.

An eleventh aspect of the present invention provides the exhaust gas treating apparatus according to the ninth aspect where the heat recovery unit 11 is made up of a set of heat exchanger tubes that recover the heat of the exhaust gas into a heating medium, and the exhaust gas treating apparatus further includes: a reheater 13, made up of a set of heat exchanger tubes that heat the exhaust gas at an exit of the desulfurizer 6 by the heating medium supplied from the heat recovery unit 11, or a cooler 25, made up of a set of heat exchanger tubes that cool the heating medium supplied from the heat recovery unit 11; a circulation line 15, making the heat exchanger tubes respectively disposed in the heat recovery unit 11 and the reheater 13 or the heat exchanger tubes respectively disposed in the heat recovery unit 11 and the cooler 25 communicate to make the heating medium circulate in interiors of the heat exchanger tubes; and an adjusting mean 10, adjusting, by the exhaust gas temperature controller 24, at least one among a circulation amount of the heating medium flowing through the circulation line 15, a heating amount of the heating medium flowing through the circulation line 15, and a cooling amount of the heating medium flowing through the circulation line 15.

A twelfth aspect of the present invention provides the exhaust gas treating apparatus according to the eighth aspect where a sulfur trioxide reducing agent supply unit or a sulfur trioxide neutralizing agent supply unit is used as the sulfur trioxide removing agent supply unit 18.

A thirteenth aspect of the present invention provides the exhaust gas treating apparatus according to the eighth aspect where a sulfur trioxide adsorbent supply unit is used as the sulfur trioxide removing agent supply unit 18.

A fourteenth aspect of the present invention provides the exhaust gas treating apparatus according to the eighth aspect further including: measurement units 21 to 23, measuring at least one among a sulfur trioxide concentration, a chlorine concentration, and a heavy metal concentration in the exhaust gas at the exit of the dry precipitator 4; an adjusting mean, adjusting a supplying amount supplied from the sulfur trioxide removing agent supply unit 18; and a sulfur trioxide removing agent supplying amount controller 24, controlling the adjusting mean to supply the sulfur trioxide removing agent of an amount that is in accordance with the measurement values of the measurement units 21 to 23.

As the heat recovery unit 11 according to the first and eighth aspects, a configuration, where a set of heat exchanger tubes, through which the heating medium that recovers the heat of the exhaust gas flows, is disposed to perform heat exchange with heat releasing equipment disposed separately from the above-described exhaust gas system, or a configuration, where cooling water is sprayed directly inside the heat recovery unit 11, etc., is used.

A portion of sulfur dioxide ($SO_2$) in an exhaust gas that is generated when a fossil fuel is combusted reacts with oxygen in the exhaust gas due to a catalytic action of a denitration catalyst, etc., and is converted to sulfur trioxide ($SO_3$). Although a conversion rate of sulfur dioxide ($SO_2$) to sulfur trioxide ($SO_3$) depends on conditions, it is approximately 1 to 3%. Although a concentration of sulfur dioxide in an exhaust gas discharged from a combustion apparatus 1, which is a coal burning boiler, etc., is generally approximately 300 to 3000 ppm and thus a concentration of sulfur trioxide in the exhaust gas is approximately 3 to 90 ppm, with a high sulfur content coal, with which a sulfur concentration in coal exceeds 4%, the concentration of sulfur trioxide may exceed 100 ppm.

According to research by the present inventors, it is clear that in a case where a fossil fuel with a high sulfur content is combusted, heavy metals in the combustion exhaust gas cannot be removed effectively by the conventionally practiced exhaust gas treating systems disclosed in Non-Patent Document 1, Patent Document 1, etc.

Because as mentioned above, the amounts of sulfur oxides ($SO_2$ and $SO_3$) generated in the exhaust gas when a fossil fuel with a comparatively high sulfur content is combusted are high in comparison to the amounts of the sulfur oxides in the exhaust gas generated when a fuel of comparatively low sulfur content is combusted, the present inventors presumed the sulfur oxides in the exhaust gas to be an impediment against the removal of heavy metals.

The present inventors have already found that the sulfuric acid mist that is generated under an atmosphere in which the temperature of the sulfur trioxide has decreased to not more than the dew point is adsorbed by ash particles that exist at a considerable amount in the exhaust gas (Japanese Published Unexamined Patent Application No. 2004-154683 (paragraph [0030], [0031])).

The dew point of sulfur trioxide depends on the amounts of the sulfur trioxide and water, and whereas the dew point of sulfur trioxide in a case of an exhaust gas of a boiler in which coal with a normal sulfur content (coal with a sulfur concentration of not more than 3%) is combusted is 120 to 160° C., the dew point of sulfur trioxide in a case of an exhaust gas of a boiler in which coal with a high sulfur content (coal with a sulfur concentration exceeding 3%) is combusted may be not less than 160° C. By adjusting the exhaust gas temperature to be not more than the dew point of sulfur trioxide ($SO_3$) that is at least not more than 180° C., the sulfur trioxide ($SO_3$) in the exhaust gas can be condensed and converted to sulfuric acid mist ($H_2SO_4$).

By thus lowering the temperature of the exhaust gas, which contains a large amount of sulfur trioxide ($SO_3$) generated from high sulfur content coal, to not more than the dew point of sulfur trioxide, the sulfur trioxide that cannot be recovered as gypsum even in a wet flue gas desulfurizer can be recovered as sulfuric acid mist. Moreover, an effect that the sulfuric acid mist becomes adsorbed by the ash particles that exist at a considerable amount in the exhaust gas is provided. Because the amount of the sulfuric acid mist that becomes adsorbed to the ash particles is a small amount, a heavy metal adsorption performance of the ash particles is hardly lowered.

It is thus considered that by placing the sulfuric acid mist ($H_2SO_4$), which is generated at a high concentration in a boiler using high sulfur content coal, under conditions of becoming actively adsorbed by the ash particles and recovering the sulfuric-acid-mist-adsorbed ash particles thus obtained, a state where hardly any sulfur trioxide ($SO_3$) exists in the exhaust gas can be realized to prevent the sulfur components in the exhaust gas from becoming discharged into the atmosphere.

However, as mentioned above, it has recently become a problem that even when either of the methods of Non-Patent Document 1 and Patent Document 1 is used, the concentrations of mercury and other heavy metals in the exhaust gas cannot be lowered from the exhaust gas of a boiler using high sulfur content coal.

As mentioned above, as a result of diligently examining why the phenomenon of not being able to recover heavy metals occurs, it was hypothesized that "ash particles to which a large amount of sulfuric acid mist has become adsorbed lose an ability to adsorb mercury and other heavy metals in the exhaust gas," and the present invention was completed by finding out that by implementing measures based on this hypothesis, the concentrations of mercury and other heavy metals can be lowered even with an exhaust gas of a combustion apparatus using high sulfur content coal.

That is, the present inventors considered that when mercury and other heavy metals coexist with sulfur trioxide ($SO_3$), which is generated in large amounts, in an exhaust gas, the sulfur trioxide ($SO_3$) becomes adsorbed with priority over mercury and other heavy metals to adsorption active sites of non-combusted portions in the ash, etc., so that with nearly all of the active sites, the adsorption of mercury and other heavy metals is impeded and the concentrations of mercury and other heavy metals in a recovered ash are significantly lowered. It was thus hypothesized that by removing the $SO_3$ in the exhaust gas before lowering the temperature in the exhaust gas, mercury can be adsorbed effectively to adsorption active sites of the non-combusted portions in the ash, and as a result of diligent study, the present inventors arrived at completing the present invention.

FIG. 3 shows mercury concentrations in ash recovered in the dry precipitator 4 when, for example, a reducing agent for removing sulfur trioxide ($SO_3$) is sprayed at an entrance (front stage) of the heat recovery unit 11 of the exhaust gas treating system shown in FIG. 1 or FIG. 2 and the temperature of the exhaust gas entering into the precipitator 4 is changed by a heat recovery unit 11 at an entrance (front stage) of the precipitator 4.

In FIG. 3, "With reducing agent" indicates a case where, for example, a reducing agent is sprayed as a sulfur trioxide ($SO_3$) removing agent at a molar equivalent ratio=1 with respect to sulfur trioxide at a rear stage of NOx removal equipment 2 (FIG. 1, FIG. 2) that includes a denitration catalyst with a mercury oxidizing function. FIG. 3 illustrates an example of using sodium bisulfite as the sulfur trioxide reducing agent. By addition of such a reducing agent, the sulfur trioxide is reduced to sulfur dioxide ($SO_2$) according to the following formula:

$$SO_3 + NaHSO_3 \rightarrow NaHSO_4 + SO_2 \tag{1}$$

With both the system in which the reducing agent is not sprayed and the system in which the reducing agent is sprayed, a comparison of a general case where the precipitator 4 is set to a temperature 160° C. with a case where the precipitator 4 is set to a low temperature (110° C.) corresponding to be not more than an acid dew point shows that the mercury (Hg) concentration in the ash recovered by the dry precipitator 4 in the case of the low temperature (110° C.) is slightly increased with respect to that in the case of the temperature of 160° C. This is considered to be a consequence of improved performance of adsorption of mercury onto the ash particles and condensation of mercury due to heavy metals in the exhaust gas becoming readily attached to solid surfaces of the ash particles, etc., by the lowering of the exhaust gas temperature.

It can be understood that when the temperature of the exhaust gas is made low (110° C.) after addition of the reducing agent, because the sulfur trioxide ($SO_3$) is reduced to sulfur dioxide ($SO_2$) as shown by Formula (1) and the exhaust gas temperature thus becomes low in a state where there is hardly any sulfur trioxide ($SO_3$) in the exhaust gas, mercury becomes adsorbed effectively to the active sites of the non-combusted portions, etc., in the ash without the sulfur trioxide ($SO_3$) becoming adsorbed to the active sites in the ash and the mercury concentration in the recovered ash thus increases significantly.

FIG. 4 shows a variation of the mercury concentration in the exhaust gas when a neutralizing agent ($Na_2CO_3$) is added at molar equivalents with respect to the sulfur trioxide ($SO_3$) in the exhaust gas. The mercury concentration in the exhaust gas was minimized when the neutralizing agent ($Na_2CO_3$) was added at an amount of 1 molar equivalent with respect to the sulfur trioxide ($SO_3$).

FIG. 5 shows a variation of concentrations of acidic substances ($SO_3$, $HCl$) in the exhaust gas when the neutralizing agent ($Na_2CO_3$) is added at molar equivalents with respect to the sulfur trioxide ($SO_3$) in the exhaust gas. Here, a control range in FIG. 5 indicates an appropriate range of an alkali supplying amount for improving the Hg removal performance.

It can be understood that because, besides the sulfur trioxide ($SO_3$), the concentration of chlorine component ($Cl_2$ or $HCl$) that improves the mercury removal performance is also decreased when the neutralizing agent ($Na_2CO_3$) is added to the exhaust gas excessively, it is preferable to measure the concentration of one or the concentrations of two or more among sulfur trioxide ($SO_3$), the chlorine component ($Cl_2$ or $HCl$), and mercury in the exhaust gas at the exit of the precipitator 4 and to spray the neutralizing agent at an amount that is in accordance with the measured concentration into the exhaust gas. The neutralizing agent is preferably added at a supplying amount close to 1 molar equivalent with respect to the sulfur trioxide ($SO_3$) in the exhaust gas and not more than 1 molar equivalent.

Also, although most of the heavy metals in the exhaust gas exist as a gas at a high temperature region in the combustion apparatus 1, the heavy metals become readily attached to the solid surfaces of the ash particles, etc., when the temperature of the exhaust gas decreases. This is because the lower the temperature of the metals and compounds thereof, the lower their vapor pressures and the more difficult it is for the metals and compounds thereof to exist as a gas. Thus, with the precipitator 4, the lower the temperature of the exhaust gas, the higher the recovery of the heavy metals with the ash particles. The heavy metals in the recovered ash can be removed and recovered from the ash as necessary or can be stabilized so as not to become eluted from the ash particles. However, when the temperature of the exhaust gas in the precipitator 4 becomes too low, the ash particles become readily condensed in the precipitator 4 and become difficult to be discharged from an ash recovery unit (hopper, etc.) at a lower portion of the precipitator 4. It is thus preferable to lower the exhaust gas temperature to a level that enables the ash to be recovered with stability from the precipitator 4.

By thus reducing the concentration of the sulfur trioxide in the exhaust gas and removing the sulfur trioxide at the entrance (front stage) of the heat recovery unit 11, it also becomes possible to prevent corrosion of the heat exchanger tubes of the heat recovery unit 11 as well as the precipitator 4 and other equipment disposed at the rear stage of the heat recovery unit 11. Furthermore, by removing the sulfur trioxide at the entrance (front stage) of the heat recovery unit 11, adsorption of sulfur trioxide to the non-combusted portions and other adsorption components in the ash can be prevented to prevent degradation of the performance of adsorption of mercury and other heavy metals by the sulfur trioxide removing agent. Because mercury and other heavy metals thus become adsorbed to the ash at the rear stage of the heat recovery unit 11, the mercury and other heavy metals can be removed efficiently. As a consequence of using the sulfur trioxide ($SO_3$) removing agent and lowering the temperature of the exhaust gas, the mercury concentration in the recovered ash is increased significantly.

FIG. 6 shows a relationship of a concentration of an acidic substance ($SO_3$, $Cl_2$, or $HCl$) in the exhaust gas and an amount of reducing agent supplied to the exhaust gas. Because, besides the sulfur trioxide ($SO_3$), the concentration of chlorine ($Cl_2$ or $HCl$) that improves the mercury removal performance is also decreased when the reducing agent is added to the exhaust gas excessively, it is preferable to measure the concentration of one or the concentrations or two or more among sulfur trioxide ($SO_3$), the chlorine component ($Cl_2$ or $HCl$), and mercury in the exhaust gas at the exit of the dry precipitator 4 and to spray the reducing agent at an amount that is in accordance with the measured concentration into the exhaust gas. FIG. 6 illustrates an example where $NaHSO_3$ is used as the reducing agent.

The concentration of sulfur trioxide ($SO_3$) can be controlled by detecting the hydrogen chloride concentration by a commercially available HCl meter, detecting the mercury concentration by a commercially available continuous mercury monitor, detecting the sulfur trioxide concentration by a commercially available sulfur trioxide concentration meter, and supplying a predetermined amount of the reducing agent into the exhaust gas based on the detected concentration of at least one of these compounds.

It is thus found that in an exhaust gas system in which sulfur trioxide ($SO_3$) does not exist, the mercury in the exhaust gas becomes adsorbed effectively to active sites of non-combusted portions, etc., in the ash. It is thus found that, even with an exhaust gas of a boiler using high sulfur content coal, mercury and other heavy metals can be removed effectively by achieving a state where hardly any sulfur trioxide ($SO_3$) is contained in the exhaust gas.

EFFECT(S) OF THE INVENTION

According to the present invention, the heavy metal concentration in the exhaust gas discharged from the combustion apparatus 1 can be reduced.

According to the first and eighth aspects of the present invention, mercury and other heavy metals in the exhaust gas can be reduced with respect to the exhaust gas exit concentration of the combustion apparatus 1 in the case of combusting high sulfur content coal. Also, because sulfur trioxide ($SO_3$) can be removed at the front stage of the heat recovery unit 11, corrosion of the heat exchanger tubes of the heat recovery unit 11 and the precipitator 4 and other equipment disposed at the rear stage of the heat recovery unit 11 can be prevented.

According to the second and ninth aspects of the present invention, in addition to the effects of the first and eighth aspects of the present invention, the lowering of the exhaust gas temperature provides the effects of making mercury and other heavy metals more readily adsorbed to the ash particles and lowering the sulfur trioxide concentration in the exhaust gas. Because the sulfur trioxide concentration is low, the amount of the sulfuric acid mist that becomes adsorbed to the ash particles is low and the performance of adsorption of mercury and other heavy metals to the ash particles hardly degrades.

According to the third and tenth aspects of the present invention, in addition to the effects of the first and eighth aspects of the present invention, mercury and other heavy metals in the exhaust gas in the case of combusting high sulfur content coal can be reduced by almost 99% with respect to the exhaust gas exit concentration of the combustion apparatus 1 and the nitrogen oxides and sulfur oxides in the exhaust gas can also be removed.

According to the fourth and eleventh aspects of the present invention, in addition to the effects of the second and ninth aspects of the present invention, the exhaust gas temperature can be adjusted readily within the same exhaust gas system because the exhaust gas temperature at the exit of the heat recovery unit 11 is adjusted by at least one among the amount of circulation of the heating medium between the heat recovery unit 11 and the reheater 13 or the cooler 25 connected to the heat recovery unit 11 by the circulating line 15, through which the heating medium flows, the heating medium heating amount, and the heating medium cooling amount.

According to the fifth and twelfth aspects of the present invention, in addition to the effects of the first and eighth aspects of the present invention, the sulfur trioxide is reduced or neutralized by the reducing agent or the neutralizing agent and can thereby be removed reliably.

According to the sixth and thirteenth aspects of the present invention, in addition to the effects of the first and eighth aspects of the present invention, the sulfur trioxide is adsorbed by the adsorbent and can thereby be removed reliably.

According to the seventh and fourteenth aspects of the present invention, in addition to the effects of the first and eighth aspects of the present invention, the appropriate amount of the sulfur trioxide removing agent can be added into the exhaust gas without degrading the performance of removal of heavy metals in the exhaust gas, and the added amount can be managed appropriately.

BEST MODE(S) FOR CARRYING OUT THE INVENTION

Embodiments of an exhaust gas treating system according to the present invention shall now be described along with the drawings.

Embodiment 1

FIG. 1 is a block diagram of an exhaust gas treating system of an embodiment of the present invention. Concentrations of exhaust gas components discharged from a boiler are: a soot/dust concentration of 20 g/m$^3$N; a NOx concentration of 200 ppm; a SOx concentration of 4000 ppm; and an Hg concentration of 10 μg/m$^3$N. As shown in FIG. 1, with the exhaust gas treating system according to the present embodiment, an exhaust gas discharged from the boiler or other combustion apparatus 1 is introduced into NOx removal equipment 2, and, after elimination of nitrogen oxides in the exhaust gas to not more than 20 ppm by a denitration catalyst, etc., inside the NOx removal equipment 2, the exhaust gas is introduced into an air preheater 3. At a front stage of the air preheater 3, a sulfur trioxide (SO$_3$) removing agent is added by a sulfur trioxide (SO$_3$) removing agent supply unit 18.

A method for adding the SO$_3$ removing agent is not restricted in particular, and supplying in a form of a solid powder or aqueous solution is possible and supplying can be performed simply by spraying the removing agent into an exhaust gas flue by a spray type nozzle, etc. With the present embodiment, an example of spraying a reducing agent as the sulfur trioxide (SO$_3$) removing agent, is illustrated, and in this example, SO$_3$ is reduced to SO$_2$. Although the sulfur trioxide (SO$_3$) removing agent is sprayed into the flue between the NOx removal equipment 2 and the air preheater 3 in the present embodiment, the setting position is not restricted in particular as long as it is at a front stage of a heat recovery unit 11.

The exhaust gas introduced into the air preheater 3 undergoes heat exchange with a combustion air that is supplied to the combustion apparatus 1 and, upon being cooled, for example, to 120 to 170° C., the exhaust gas is introduced into the heat recovery unit 11. The heat of the exhaust gas introduced into the heat recovery unit 11 is recovered by heat exchange with a heating medium that flows through a heat exchanger tube and the exhaust gas is preferably cooled to increase a solid adsorption performance of non-combusted portions in ash. By the exhaust gas being lowered in temperature, mercury and other heavy metals become readily adsorbed to ash particles. The exhaust gas temperature is preferably lowered to near a dew point of sulfur trioxide, and in this case, the sulfur trioxide in the exhaust gas becomes converted to sulfuric acid mist so that hardly any sulfur trioxide remains contained in the exhaust gas. Because the sulfur trioxide concentration is low at this stage, the amount of sulfuric acid mist that becomes adsorbed to the ash particles is low and the performance of adsorption of mercury and other heavy metals to the ash particles hardly degrades.

The exhaust gas that has passed through the dry electrostatic precipitator 4 is raised in pressure and introduced by an induction fan 5 into a wet flue gas desulfurizer 6, which is based on a spray type limestone-gypsum method and is one example of a desulfurizer, and sulfur oxides (SOx) in the exhaust gas are removed by gas-liquid contact of the exhaust gas and an exhaust gas absorbing solution. The exhaust gas, which has been cooled to a saturation gas temperature in the wet flue gas desulfurizer 6, is raised in temperature by a reheater 13 and then discharged from a chimney 8 via a desulfurization fan 7. As with the heat recovery unit 11, the reheater 13 is a heat exchanger having a heat exchanger tube through which the heating medium flows, and the exhaust gas is raised in temperature, for example, to 90 to 110° C. by heat exchange with the heating medium that flows through the heat exchanger tube. The heat exchanger tubes of the heat recovery unit 11 and the reheater 13 are made to communicate by the heating medium circulating ducts 15-1 and 15-2, and the heating medium is made to circulate between the heat recovery unit 11 and the reheater 13 by a pump 10. An exhaust gas thermometer 20 is disposed to measure an exit exhaust gas temperature of the heat recovery unit 11. Furthermore, a controller 24 is installed to determine an amount of the heating medium circulated by the heating medium pump 10, etc., to control the exit exhaust gas temperature of the heat recovery unit 11 based on a measurement result of the exhaust gas thermometer 20.

Although not illustrated, control of the exhaust gas temperature by the heating medium flow rate may also be performed by using one or more among a means that cools the heating medium, a means that heats the heating medium, and a means of adjusting the heating medium flow rate in a bypass tube that is installed so as to shortcut an entrance and an exit of the heating medium duct passing through the heat recovery unit 11. The control of the exhaust gas temperature by the heating medium flow rate is performed in common in other embodiments as well.

The exit exhaust gas temperature of the heat recovery unit 11 may also be adjusted, without using the reheater 13, by exchange of heat with a component outside the exhaust gas system shown in FIG. 1.

With the exhaust gas treating system shown in FIG. 1, the sulfur trioxide ($SO_3$) concentration can be lowered as described above Formula (1) by adding, for example, sodium bisulfite (sodium hydrogen sulfite; $NaHSO_3$) as a reducing agent. And by controlling the exhaust gas temperature at the exit of the heat recovery unit 11 by the heating medium circulation amount of the pump 10, etc., based on the exhaust gas temperature measurement value of the exhaust gas thermometer 20, the amount of adsorption of the mercury in the exhaust gas to the ash can be increased to improve removal efficiency of the mercury in the exhaust gas.

As already described, FIG. 6 shows the relationship of the concentration of an acidic substance ($SO_3$, $Cl_2$, or HCl) in the exhaust gas and the amount of the reducing agent supplied into the exhaust gas. Although not illustrated, because, besides the sulfur trioxide ($SO_3$), the concentration of chlorine ($Cl_2$ or HCl) that improves the mercury removal performance is also decreased when the reducing agent ($NaHSO_3$) is added to the exhaust gas excessively, it is preferable to measure the concentration of one or the concentrations of two or more among sulfur trioxide ($SO_3$), the chlorine component ($Cl_2$ or HCl), and mercury in the exhaust gas at the exit of the dry precipitator 4 and to spray the reducing agent at an amount that is in accordance with the measured concentration into the exhaust gas.

Besides sodium bisulfite ($NaHSO_3$) sodium sulfite ($Na_2SO_3$) potassium bisulfite ($KHSO_3$), potassium sulfite ($K_2SO_3$), calcium sulfite ($CaSO_3$), etc., may be used as the reducing agent. Whereas the sulfur trioxide ($SO_3$) concentration in the exhaust gas is not more than 50 ppm in a case where coal, used for example in a coal-burning boiler as the combustion apparatus 1, has a sulfur content of not more than 2%, when coal with a high sulfur content of not less than 4% is combusted, the sulfur trioxide ($SO_3$) concentration exceeds 100 pm. It is presumed that, under such an exhaust gas condition where a comparatively large amount of sulfur trioxide ($SO_3$) is contained, sulfur trioxide ($SO_3$) became adsorbed to active sites of the non-combusted portions in the ash and the adsorbed sulfur trioxide ($SO_3$) inhibited the adsorption of the mercury in the exhaust gas.

With the exhaust gas treating system according to the present embodiment, because the sulfur trioxide ($SO_3$) in the exhaust gas at the exit side of the heat recovery unit 11 is reduced by the addition of the reducing agent or other sulfur trioxide ($SO_3$) removing agent, the amount of mercury adsorbed to the ash is increased and not less than 50% of the mercury existing in the exhaust gas can be removed at the dry electrostatic precipitator 4. With inclusion of removal of mercury at the wet flue gas desulfurizer 6 disposed at the rear stage of the heat recovery unit 11, not less than 99% of the mercury in the exhaust gas could be removed. Also, by suitably adding the sulfur trioxide ($SO_3$) reducing agent into the exhaust gas to reduce and remove the sulfuric acid mist, corrosion of the equipment at stages at the rear of the $SO_3$ removing agent supply unit 18 can be prevented and corrosion of the units could be prevented even at one year from a start of operation. The mercury concentration in the exhaust gas could be confirmed to meet regulation values by monitoring by a continuous mercury monitor incorporated in a measurement unit 9 disposed in front of the chimney 8, and the NOx and SOx in the exhaust gas could be confirmed to respectively meet regulation values by monitoring by respective monitors incorporated in the measurement unit 9. Although plant operation is discontinued if the regulation values are deviated from, deviations from the regulation values do not occur with the present embodiment.

Embodiment 2

With Embodiment 2 of the present invention, shown in FIG. 2, an example of using a neutralizing agent as the sulfur trioxide ($SO_3$) removing agent is illustrated. By addition, for example, of sodium carbonate ($Na_2CO_3$) as the neutralizing agent from the $SO_3$ removing agent supply unit 18 shown in FIG. 2, the concentration of $SO_3$ in the exhaust gas is reduced according to Formula (2) shown below:

$$SO_3 + Na_2CO_3 \rightarrow Na_2SO_4 + CO_2 \qquad (2)$$

FIG. 4 shows the variation of the mercury concentration in the exhaust gas when the neutralizing agent ($Na_2CO_3$) is added at molar equivalents with respect to the sulfur trioxide ($SO_3$) in the exhaust gas, and the mercury concentration in the exhaust gas was minimized when the neutralizing agent ($Na_2CO_3$) was added at an amount of 1 molar equivalent with respect to the sulfur trioxide ($SO_3$).

FIG. 5 shows the variation of concentrations of acidic substances ($SO_3$, HCl) in the exhaust gas when the neutralizing agent ($Na_2CO_3$) is added at molar equivalents with respect to the sulfur trioxide ($SO_3$) in the exhaust gas, and the control range of the added amount of the neutralizing agent ($Na_2CO_3$) indicates the appropriate range of the alkali supplying amount for improving the Hg removal performance.

It can be understood that because, besides the sulfur trioxide ($SO_3$), the concentration of chlorine component ($Cl_2$ or HCl) that improves the mercury removal performance is also decreased when the neutralizing agent ($Na_2CO_3$) is added to the exhaust gas excessively, it is preferable to measure the concentration of one or the concentrations of two or more among sulfur trioxide ($SO_3$), the chlorine component ($Cl_2$ or HCl), and mercury in the exhaust gas at the exit of the precipitator 4 and to spray the neutralizing agent at an amount that is in accordance with the measured concentration into the exhaust gas. The neutralizing agent is preferably added at a supplying amount close to 1 molar equivalent with respect to the sulfur trioxide ($SO_3$) in the exhaust gas and not more than 1 molar equivalent.

Besides sodium carbonate, sodium bicarbonate ($NaHCO_3$), potassium carbonate ($K_2CO_3$), potassium bicarbonate ($KHCO_3$), calcium carbonate ($CaCO_3$), etc., which are likewise alkaline, may be used as the neutralizing agent, and the neutralizing agent is not restricted to these compounds.

With the exhaust gas treating system according to the present embodiment, the exhaust gas from the combustion apparatus 1 is introduced into the NOx removal equipment 2, and, after elimination of the nitrogen oxides in the exhaust gas by the denitration catalyst, etc., inside the NOx removal equipment 2, the exhaust gas is introduced into the air preheater 3. At the front stage of the air preheater 3, the sulfur trioxide ($SO_3$) removing agent is added by the sulfur trioxide ($SO_3$) removing agent supply unit 18 as in Embodiment 1. With the present embodiment, an example of adding the neutralizing agent as the $SO_3$ removing agent is illustrated, and because the configuration of other portions is the same as that of Embodiment 1, description thereof is omitted.

The exit exhaust gas temperature of the heat recovery unit 11 may also be adjusted, without using the reheater 13, by exchange of heat with a component outside the exhaust gas system shown in FIG. 1.

Although the neutralizing agent spraying position is preferably at a rear stage of the NOx removal equipment 2, because the neutralization reaction is completed quickly, the spraying position may be at a front stage (immediately in front of the entrance) of the heat recovery unit 11. Because Na, K, Ca and other components in the neutralizing agent are components that degrade the denitration catalyst, by adding the neutralizing agent at the rear stage of the NOx removal equipment 2, degradation of the denitration catalyst can be prevented. Also, because, by an action of the denitration catalyst in the NOx removal equipment 2, a portion of sulfur dioxide gas ($SO_2$) in the exhaust gas reacts with oxygen in the exhaust gas to be converted to sulfur trioxide ($SO_3$), it is preferable to perform treatment by spraying of the neutralizing agent after the $SO_3$ amount increases. However, because as mentioned above, the neutralization reaction is completed quickly, the neutralizing agent may be added at the front stage of the heat recovery unit 11.

With the exhaust gas treating system shown in FIG. 2, an $SO_3$ concentration meter 21, measuring the $SO_3$ concentration in the exit exhaust gas of the dry electrostatic precipitator 4, a hydrogen chloride concentration meter 22, measuring a hydrogen chloride concentration in the exhaust gas, and a heavy metal concentration meter 23, measuring a heavy metal concentration, are disposed.

With the present embodiment, a neutralizing agent supplying amount from the $SO_3$ removing agent supply unit 18 is controlled based on a command from the controller 24 based on a measurement value of at least one among the $SO_3$ concentration meter 21, the hydrogen chloride concentration meter 22, and the heavy metal concentration meter 23 that measures the heavy metal concentration. The controller 24 for the neutralizing agent supplying amount may be disposed separately from or may be used in common as shown in FIG. 2 as the controller 24 that determines the heating medium circulating amount of the heating medium pump 10 for controlling the exit exhaust gas temperature of the heat recovery unit 11.

To prevent the chlorine amount necessary for oxidation of mercury from decreasing by a desalting reaction due to the addition of the alkali, the neutralizing agent addition amount is preferably adjusted by continuously detecting the chlorine component concentration by the hydrogen chloride concentration meter 22 and suppressing the neutralizing agent supplying amount from the $SO_3$ removing agent supply unit 18 before a chlorine concentration decrease amount $\Delta$ increases.

Whereas the sulfur trioxide ($SO_3$) concentration in the exhaust gas is not more than 50 ppm in the case where the coal used in a coal-burning boiler, etc., has a sulfur content of not more than 2%, when coal of a high sulfur content of not less than 4% is combusted, the sulfur trioxide ($SO_3$) concentration exceeds 100 ppm. Under such an exhaust gas condition, mercury hardly becomes adsorbed to the ash and is not removed at the precipitator 4.

In the present embodiment, because the $SO_3$ concentration in the exhaust gas is reduced due to neutralization of $SO_3$ by the $SO_3$ neutralizing agent and the exhaust gas temperature is lowered at the heat recovery unit 11, mercury becomes adsorbed effectively to active sites of non-combusted portions in the ash, and by significant increase of the mercury concentration in the recovered ash, not less than 60% of the mercury in the exhaust gas can be removed, and with the inclusion of removal at the wet flue gas desulfurizer 6 disposed at the rear stage of the heat recovery unit 11, not less than 99% of the mercury in the exhaust gas could be removed.

At the measurement unit 9 disposed in front of the chimney 8, the hazardous components in the exhaust gas were monitored continuously by the continuous mercury analyzer, the NOx meter, and the SOx meter and it was confirmed that the NOx concentration is not more than 20 ppm, the SOx concentration is not more than 40 ppm, and the Hg concentration is not more than 0.1 $\mu g/m^3 N$. Also, by suitably adding the $SO_3$ neutralizing agent into the exhaust gas to neutralize and render harmless the sulfuric acid mist, the corrosion of the equipment at stages at the rear of the $SO_3$ removing agent supply unit 18 can be prevented and the corrosion of the equipment could be prevented even at one year from the start of operation.

Embodiment 3

With Embodiment 3 of the present invention, an example of using an adsorbent as the $SO_3$ removing agent is illustrated. Because besides using the adsorbent as the $SO_3$ removing agent, the present embodiment is the same as Embodiment 1 and Embodiment 2, description of redundant portions is omitted.

For example, powder activated carbon is added as the absorbent from the $SO_3$ removing agent supply unit 18 of FIG. 1 or FIG. 2, and the $SO_3$ concentration in the exhaust gas is reduced by $SO_3$ becoming adsorbed to the adsorbent. As mentioned above, it is considered that when mercury coexists with sulfur trioxide ($SO_3$) in the exhaust gas, the $SO_3$ becomes adsorbed with priority over mercury to the active sites of the non-combusted portions, etc., in the ash. It is thus presumed when the adsorbent is added into the exhaust gas in which sulfur trioxide ($SO_3$) and mercury coexist, $SO_3$ becomes adsorbed with good efficiency to the adsorption active sites of the adsorbent.

Although in the present case, powder activated carbon with an average particle diameter of 15 $\mu m$ was used as the adsorbent, besides this, soot/dust recovery ash (coal ash), which exhibits adsorption performance and to which the sulfuric acid mist has not become attached, silica gel, alumina, zeolite, synthetic zeolite, a metal oxide, etc., may be used.

With the exhaust gas from which sulfur trioxide ($SO_3$) has been removed at the front stage of the heat recovery unit 11, mercury became adsorbed to soot/dust due to the lowering of temperature at the exit at the heat recovery unit 11 and specifically, by the addition of the adsorbent, the Hg concentration in the ash increased from 50 $\mu g/kg$ to 300 $\mu g/kg$.

Although heavy metals besides mercury, such as selenium (Se), lead (Pb), zinc (Zn), cadmium (Cd), chromium (Cr), arsenic (As), etc., are lower in vapor pressure than mercury and trapping performance of such heavy metals by activated carbon in the dry precipitator 4 is high, improvement of the trapping performance by application of the present invention is seen as shown in Table 1. At the measurement unit 9 disposed in front of the chimney 8, the hazardous components in the exhaust gas were monitored continuously by the continuous mercury analyzer, the NOx meter, and the SOx meter and it was confirmed that the NOx concentration is not more than 15 ppm, the SOx concentration is not more than 30 ppm, and the Hg concentration is not more than 0.2 $\mu g/m^3 N$.

TABLE 1

| Sample position | Weight in exhaust gas ($\mu g/m^3$) | | | | | | |
|---|---|---|---|---|---|---|---|
|  | Cr | Zn | As | Se | Cd | Sb | Pb |
| Precipitator entrance | 0.483 | 0.748 | 0.191 | 176.256 | 0.055 | 0.097 | 1.350 |
| Precipitator exit | 0.471 | 0.603 | 0.289 | 40.005 | 0.028 | 0.021 | 0.314 |

TABLE 1-continued

| | Weight in exhaust gas (μg/m³) | | | | | | |
|---|---|---|---|---|---|---|---|
| Sample position | Cr | Zn | As | Se | Cd | Sb | Pb |
| Precipitator exit, with SO₃ adsorbent | 0.280 | 0.410 | 0.063 | 9.000 | 0.018 | 0.016 | 0.200 |

Embodiment 4

FIG. 7 shows a block diagram of an embodiment, with which the exit exhaust gas temperature of the heat recovery unit 11 is adjusted, without using the reheater 13 of the exhaust gas treating system shown in FIG. 1, by exchange of heat with a component outside the exhaust gas system.

With the configuration shown in FIG. 7, the boiler 1, the NOx removal equipment 2, the air preheater 3, the electrostatic precipitator 4, the heat recovery unit 11, the induction fan 5, the wet flue gas desulfurizer 6, the desulfurization fan 7, the measurement unit 9, the chimney 8, the sulfur trioxide (SO₃) removing agent supply unit 18, the thermometer 20 at the heat recovery unit exit, and the controller 24 are the same as those of Embodiment 1 and description thereof shall be omitted.

With the present system, the heating medium that recovers heat from the exhaust gas at the heat recovery unit 11 is introduced by the heating medium circulating duct 15-1 into a feed-water heater (a heating medium cooler) 25 and after performing feed-water heating of the boiler 1, the heating medium is introduced again into the heat recovery unit 11 by the heating medium circulating duct 15-2. The heating medium is circulated between the heat recovery unit 11 and feed-water heater 25 by the pump 10.

The exhaust gas thermometer 20 is disposed to measure the exit exhaust gas temperature of the heat recovery unit 11. Also, the controller 24 is installed to determine the amount of the heating medium circulated by the heating medium pump 10, etc., to control the exit exhaust gas temperature of the heat recovery unit 11 based on the measurement result of the exhaust gas thermometer 20.

The control of the exhaust gas temperature by the heating medium flow rate may also be performed by using a means that cools the heating medium, by using a means that heats the heating medium, or by installing a bypass tube 26 that shortcuts an entrance and an exit of the heating medium ducts 15-1 and 15-2 passing through the heat recovery unit 11 and using a heating medium flow control valve 27 for adjusting the heating medium flow rate inside the bypass tube 26.

In the present system, the configuration, shown in FIG. 2, having the SO₃ concentration meter 21, measuring the SO₃ concentration in the exit exhaust gas of the dry electrostatic precipitator 4, the hydrogen chloride concentration meter 22, measuring the hydrogen chloride concentration in the exhaust gas, and the heavy metal concentration meter 23, measuring the heavy metal concentration, may be adopted. In this case, the neutralizing agent supplying amount from the SO₃ removing agent supply unit 18 is controlled based on a command from the controller 24 based on a measurement value of at least one among the SO₃ concentration meter 21, the hydrogen chloride concentration meter 22, and the heavy metal concentration meter 23 that measures the heavy metal concentration.

With the present system, because the boiler feed-water is heated, a contribution can be made to improving the efficiency of the boiler. Also with the present system, because the exhaust gas, which is made by the sulfur trioxide removing agent to have hardly any sulfur trioxide (SO₃) existing therein, is cooled by the heat recovery unit 11, mercury and other heavy metals in the exhaust gas were adsorbed effectively to the soot/dust, the concentrations of mercury and other heavy metals in the recovered ash were significantly increased, not less than 50% of the mercury in the exhaust gas could be removed, and with the inclusion of the removal of mercury at the wet flue gas desulfurizer 6 in the rear stage, not less than 99% of the mercury in the exhaust gas could be removed.

INDUSTRIAL APPLICABILITY

According to the present invention, the concentrations of mercury and other heavy metals in the exhaust gas discharged from a chimney, etc., can be reduced. The present invention thus has applicability not only to environmental fields but to industry and various other technical fields as an art of effectively reducing heavy metals emitted by combustion.

BRIEF DESCRIPTION OF THE DRAWINGS

FIG. 3 is a diagram showing mercury concentrations in ash recovered in a dry precipitator under various conditions using a reducing agent as an SO₃ removing agent in the exhaust gas treating system according to the present invention.

FIG. 4 shows a variation of a mercury concentration in an exhaust gas when a neutralizing agent is added at molar equivalents with respect to sulfur trioxide in the exhaust gas in the exhaust gas treating system according to the present invention.

FIG. 6 is a diagram of a relationship of a reducing agent addition amount and an acidic gas concentration in the exhaust gas treating system according to the present invention.

Figure 1:
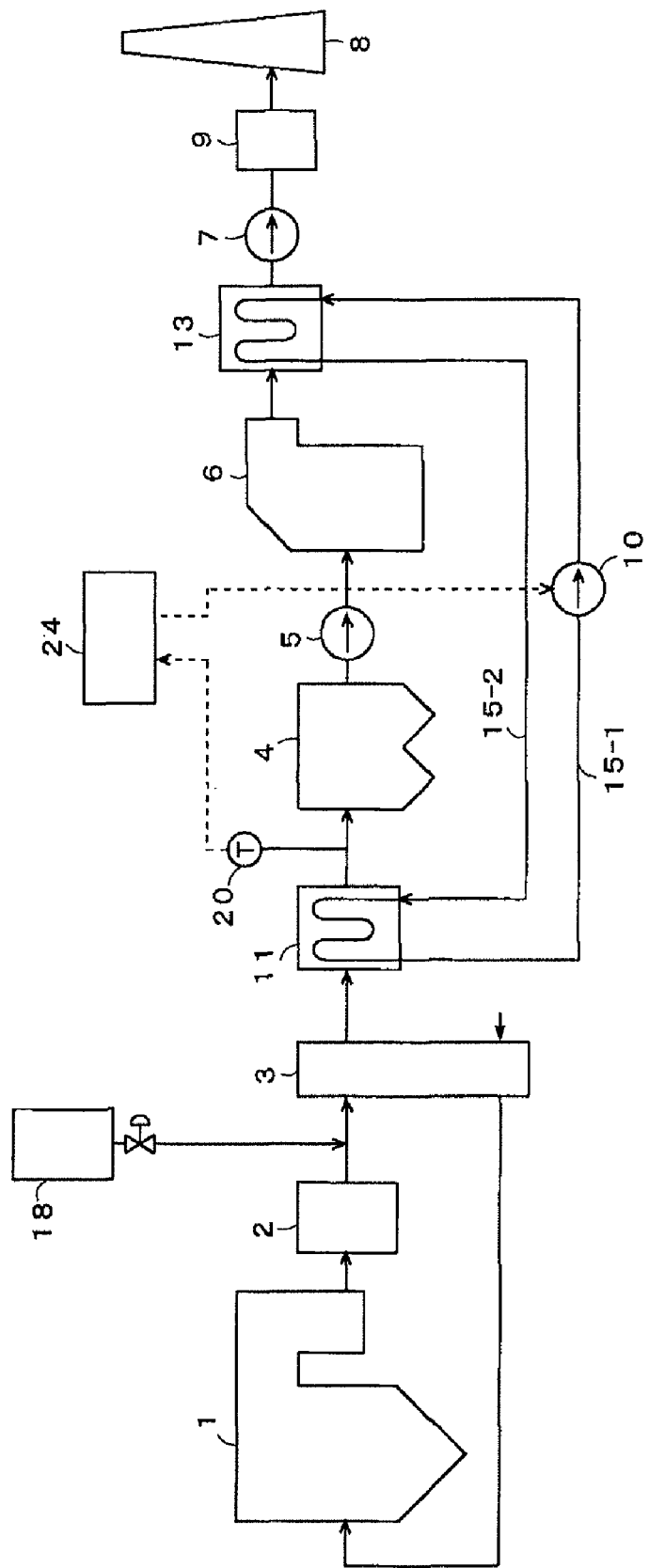
FIG. 1 is a block diagram of an exhaust gas treating system according to Embodiments 1, 3, and 4 of the present invention.
Figure 2:
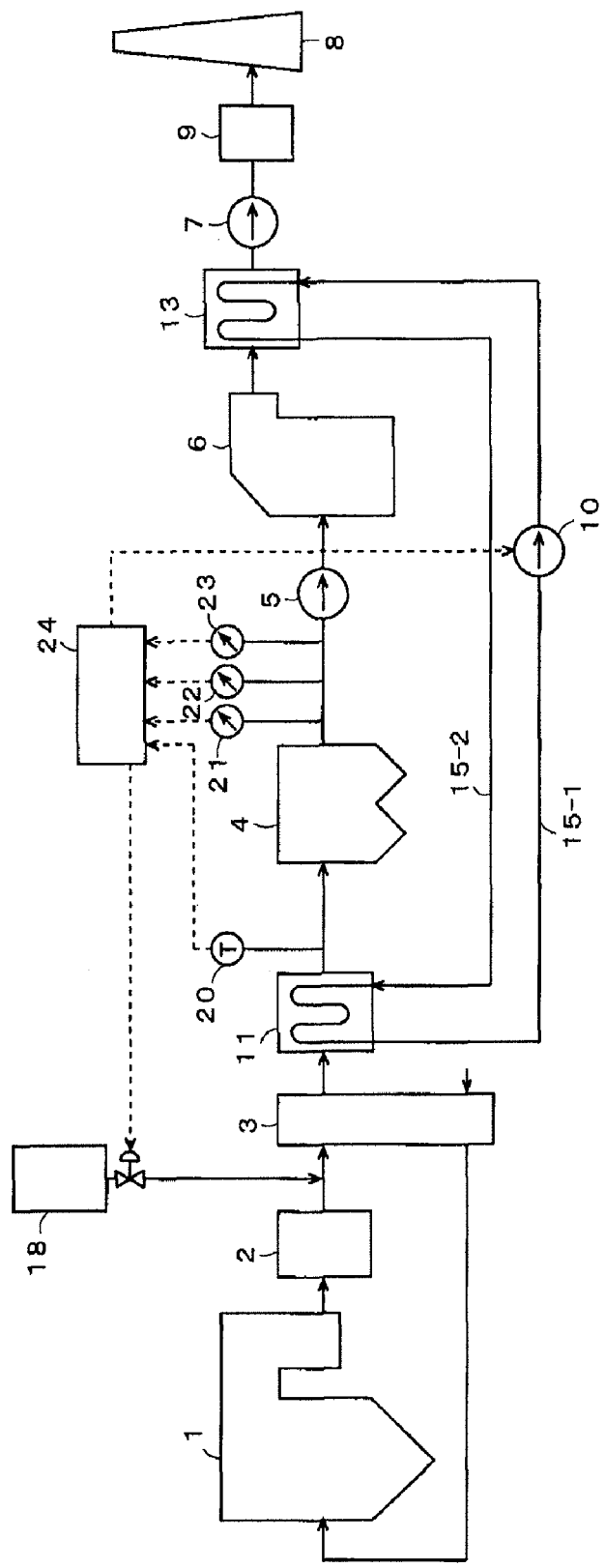
FIG. 2 is a block diagram of an exhaust gas treating system according to Embodiments 2, 3, and 4 of the present invention.
Figure 5:
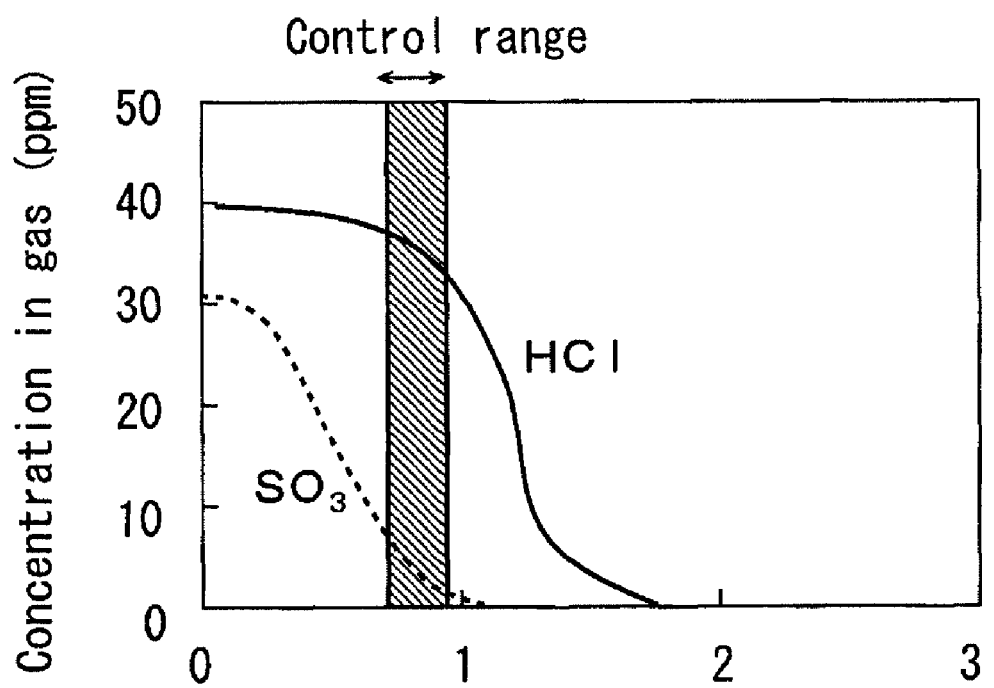
FIG. 5 shows a variation of concentrations of acidic substances (SO₃, HCl) in the exhaust gas when the neutralizing agent is added at molar equivalents with respect to the sulfur trioxide in the exhaust gas in the exhaust gas treating system according to the present invention.
Figure 7:
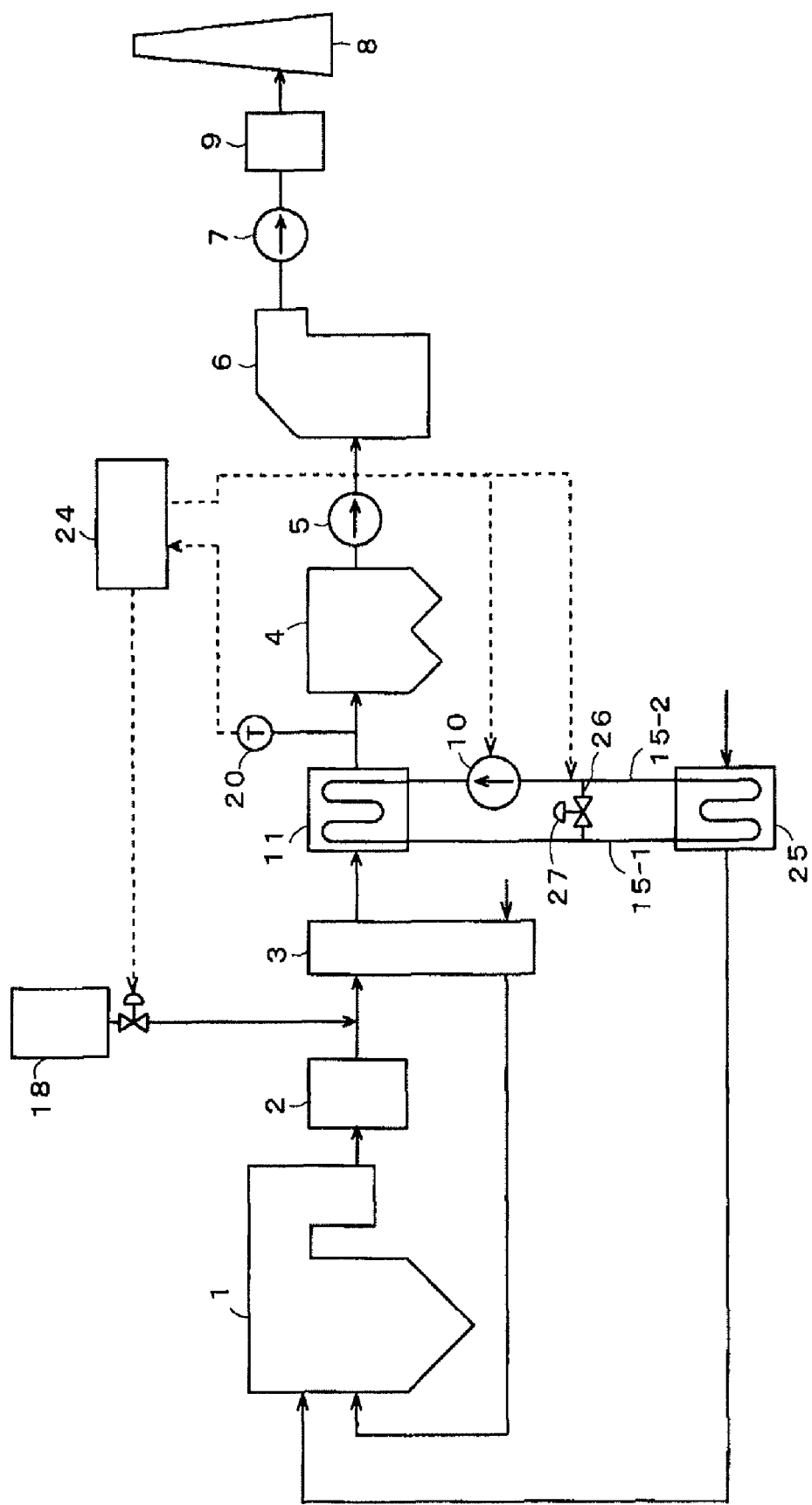
FIG. 7 is a block diagram of an exhaust gas treating system with which an exit exhaust gas temperature of a heat recovery unit is adjusted by exchange of heat from outside an exhaust gas system according to the present invention.
Figure 8:
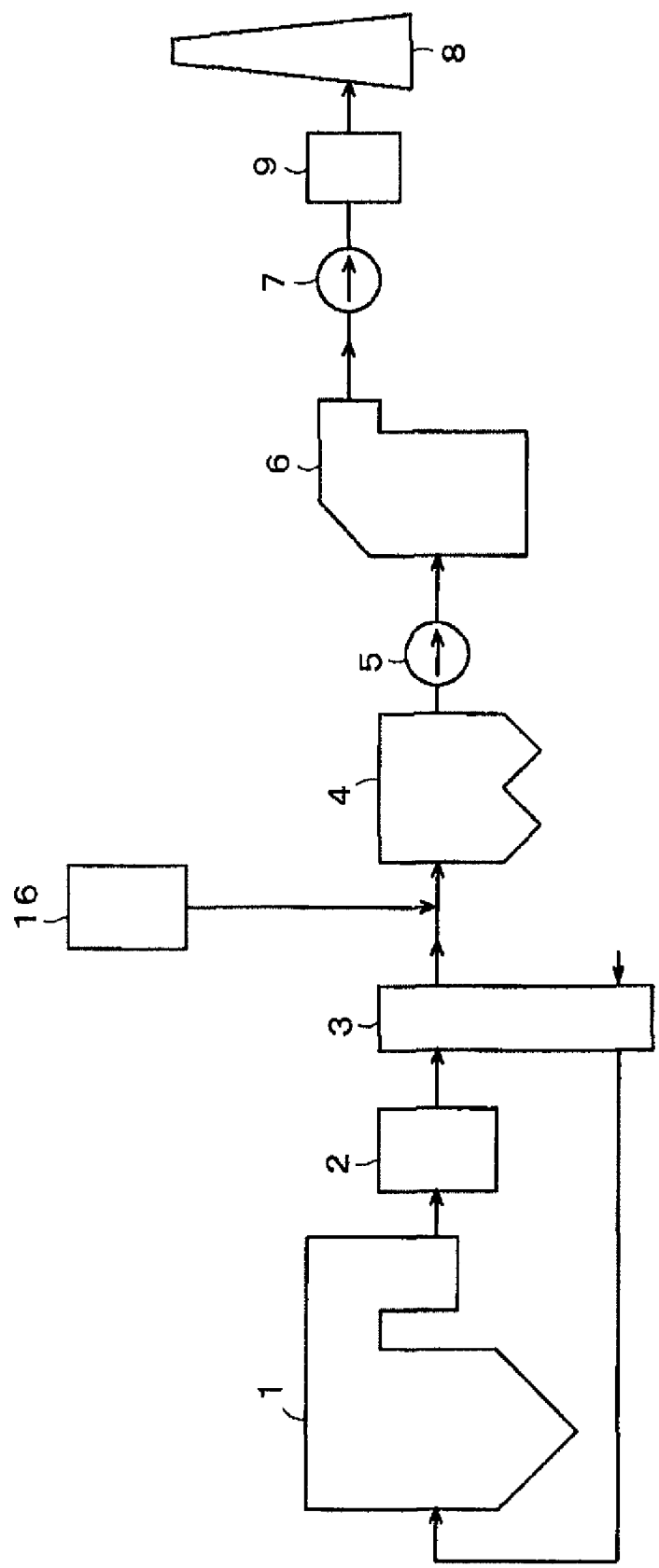
FIG. 8 is a block diagram of an exhaust gas treating system according to a conventional art.
Figure 9:
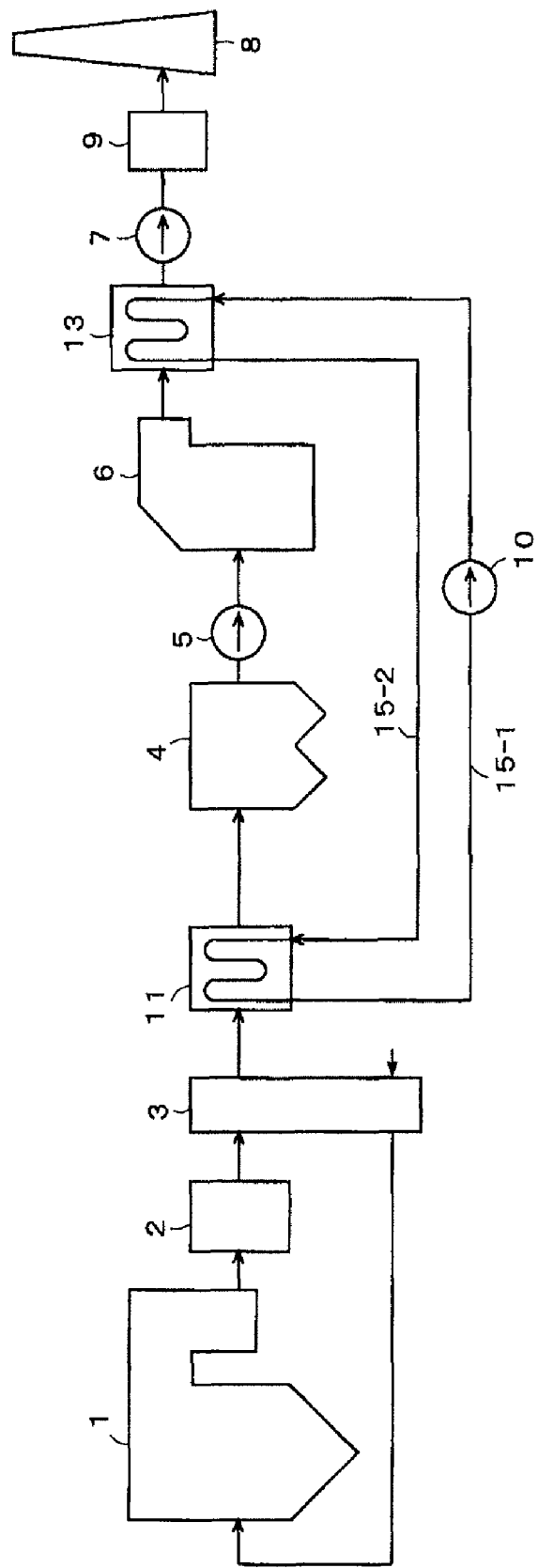
FIG. 9 is a block diagram of an exhaust gas treating system according to a conventional art.

| Description of the Reference Numerals | |
|---|---|
| 1 combustion apparatus | 2 NOx removal equipment |
| 3 air preheater | 4 dry electrostatic precipitator |
| 5 induction fan | 6 wet flue gas desulfurizer |
| 7 boost-up fan | 8 chimney |

-continued

Description of the Reference Numerals

| | | | |
|---|---|---|---|
| 9 | measurement unit | 10 | pump |
| 11 | heat recovery unit | 13 | reheater |
| 15 | heating medium circulating duct | 16 | mercury adsorbent supply unit |
| 18 | SO₃ removing agent supply unit | | |
| 20 | thermometer | | |
| 21 | SO₃ concentration meter | 22 | hydrogen chloride concentration meter |
| 23 | heavy metal concentration meter | 24 | controller |
| 25 | feed-water heater | 26 | bypass line |
| 27 | heating medium flow control valve | 28 | boiler feed-water line thermometer |

What is claimed is:

1. A method of treating an exhaust gas comprising heavy metals comprising:
preheating a combustion air of a combustion apparatus by the exhaust gas comprising heavy metals discharged from the combustion apparatus;
recovering heat from the exhaust gas by a heat recovery unit after the air preheating;
recovering the heavy metals and soot/dust in the exhaust gas at an exit of the heat recovery unit by a dry precipitator;
supplying a sulfur trioxide removing agent into the exhaust gas at an upstream side of an entrance of the heat recovery unit; and
lowering an exhaust gas temperature at the exit of the heat recovery unit to a dew point temperature of sulfur trioxide.

2. The method of treating an exhaust gas comprising heavy metals according to claim 1, wherein a nitrogen oxide in the exhaust gas is denitrated by a denitration catalyst before the air preheating and a sulfur oxide in the exhaust gas is desulfurized at the exit of the dry precipitator.

3. The method of treating an exhaust gas comprising heavy metals according to claim 1, wherein the heat of the exhaust gas is recovered by a heating medium in the heat recovery unit, the heating medium is circulatingly supplied to a reheater, disposed for heating the desulfurized exhaust gas by the heating medium supplied from the heat recovery unit, or a cooler, disposed for cooling the heating medium supplied from the heat recovery unit, and the exhaust gas temperature at the exit of the heat recovery unit is lowered to the dew point temperature of sulfur trioxide by adjusting at least one among a heating medium circulation amount, a heating medium heating amount, and a heating medium cooling amount.

4. The method of treating an exhaust gas comprising heavy metals according to claim 1, wherein a sulfur trioxide reducing agent is used as the sulfur trioxide removing agent.

5. The method of treating an exhaust gas comprising heavy metals according to claim 1, wherein a sulfur trioxide adsorbent is used as the sulfur trioxide removing agent.

6. The method of treating an exhaust gas comprising heavy metals according to claim 1, wherein at least one among a sulfur trioxide concentration, a chlorine concentration, and a heavy metal concentration in the exhaust gas at the exit of the dry precipitator is measured and an amount of the sulfur trioxide removing agent that is in accordance with the measured concentration is supplied into the exhaust gas.

7. The method of treating the exhaust gas comprising heavy metals according to claim 1, wherein a sulfur trioxide neutralizing agent is used as the sulfur trioxide removing agent.

8. An apparatus for treating an exhaust gas comprising heavy metals comprising:
an air preheater, preheating a combustion air of the combustion apparatus by the exhaust gas comprising heavy metals discharged from the combustion apparatus;
a heat recovery unit, recovering heat from the exhaust gas at an exit of the air preheater;
a dry precipitator, recovering the heavy metals and soot/dust in the exhaust gas at an exit of the heat recovery unit; which are successively disposed from an upstream side to a downstream side of an exhaust gas duct of a combustion apparatus;
a sulfur trioxide removing agent supply unit, supplying a sulfur trioxide removing agent into the exhaust gas at an upstream side of an entrance of the heat recovery unit; and
an exhaust gas temperature controller, performing control to lower an exhaust gas temperature at the exit of the heat recovery unit to a dew point temperature of sulfur trioxide.

9. The apparatus for treating an exhaust gas comprising heavy metals according to claim 8, further comprising: NOx removal equipment, denitrating a nitrogen oxide in the exhaust gas generated from the combustion apparatus and disposed at an upstream side of an entrance of the air preheater; and a desulfurizer, desulfurizing a sulfur oxide in the exhaust gas at the exit of the dry precipitator.

10. The apparatus for treating an exhaust gas comprising heavy metals according to claim 8, wherein the heat recovery unit comprises a set of heat exchanger tubes that recover the heat of the exhaust gas into a heating medium, and the exhaust gas treating apparatus further comprises:
a reheater, in turn comprising a set of heat exchanger tubes that heat the exhaust gas at an exit of the desulfurizer by the heating medium supplied from the heat recovery unit, or a cooler, in turn comprising a set of heat exchanger tubes that cool the heating medium supplied from the heat recovery unit;
a circulation line, making the heat exchanger tubes respectively disposed in the heat recovery unit and the reheater or the heat exchanger tubes respectively disposed in the heat recovery unit and the cooler communicate to make the heating medium circulate in interiors of the heat exchanger tubes; and
an adjusting mean, adjusting, by the exhaust gas temperature controller, at least one among a circulation amount of the heating medium flowing through the circulation line, a heating amount of the heating medium flowing through the circulation line, and a cooling amount of the heating medium flowing through the circulation line.

11. The apparatus for treating an exhaust gas comprising heavy metals according to claim 8, wherein a sulfur trioxide reducing agent supply unit is used as the sulfur trioxide removing agent supply unit.

12. The apparatus for treating an exhaust gas comprising heavy metals according to claim 8, wherein a sulfur trioxide adsorbent supply unit is used as the sulfur trioxide removing agent supply unit.

13. The apparatus for treating an exhaust gas comprising heavy metals according to claim 8 further comprising:

a measurement unit, measuring at least one among a sulfur trioxide concentration, a chlorine concentration, and a heavy metal concentration in the exhaust gas at the exit of the dry precipitator;

an adjusting mean, adjusting a supplying amount supplied from the sulfur trioxide removing agent supply unit; and a sulfur trioxide removing agent supplying amount controller, controlling the adjusting mean to supply the sulfur trioxide removing agent of an amount that is in accordance with the measurement value of the measurement unit.

14. The apparatus for treating an exhaust gas comprising heavy metals according to claim 8, wherein a sulfur trioxide neutralizing agent supply unit is used as the sulfur trioxide removing agent supply unit.

* * * * *